Dec. 21, 1965    J. A. MASON    3,224,536
MAGNETIC COIL CLUTCH
Filed July 25, 1962
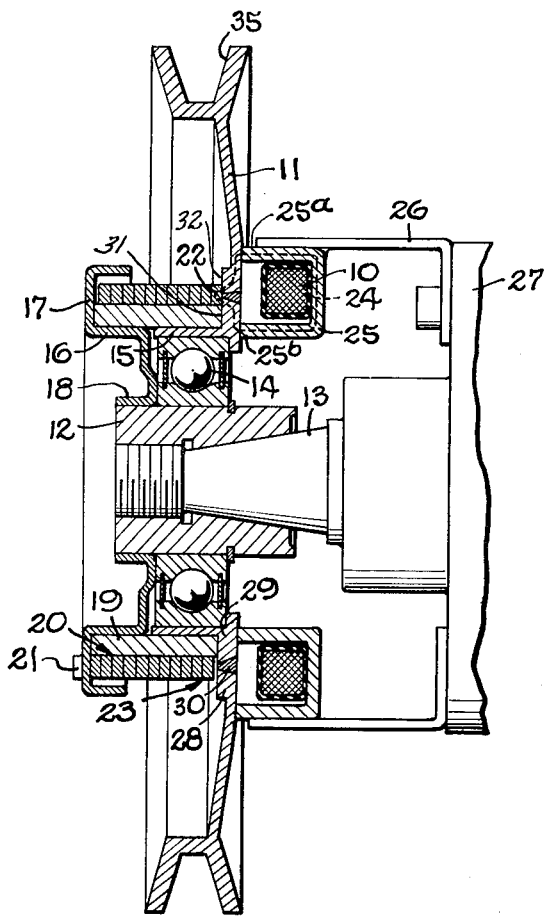
INVENTOR
James A. Mason
By Wolfe, Hubbard, Voit & Osann
ATTORNEY 3,224,536
MAGNETIC COIL CLUTCH
James A. Mason, Grand Rapids, Mich., assignor to Warner Electric Brake & Clutch Company, South Beloit, Ill., a corporation of Delaware
Filed July 25, 1962, Ser. No. 212,410
2 Claims. (Cl. 192—81)

This application is a continuation-in-part of my prior application Ser. No. 2,364, filed January 14, 1960 now Pat. No. 3,095,071.

This invention relates to so-called coil clutches of the magnetically controlled type in which a pilot friction torque is applied to one end of a helical actuator coil to effect the winding or unwinding thereof and the engagement of a main friction clutch by gripping axially spaced annular surfaces on relatively rotatable driving and driven members. In such clutches, one end turn of the actuator coil constitutes the armature of the magnetic pilot clutch and is disposed opposite pole faces rotatable with one of the main clutch surfaces and radially separated by a nonmagnetic connector by which flux is directed into and out of the armature.

The present invention aims to substantially increase the axial compactness of a clutch of the above character by providing for transmission of the torque developed by the clutch through the magnetic connection between the inner and outer pole pieces of the pilot clutch.

A more detailed object is to form the pole pieces as a two-piece radial flange on one of the members of the main clutch and adapt the outer part of the flange for receiving or delivering all of the torque transmitted by the main clutch.

Other objects and advantages of the invention will become apparent from the following detailed description taken in connection with the accompanying drawing which is a diametrical cross-sectional view of a magnetic coil clutch embodying the novel features of the present invention.

In the drawing the invention is shown incorporated in a friction clutch engaged and disengaged by energization of a magnet winding 10 to couple or uncouple a driving member 11 and a member 12 fixed on the end of a driven shaft 13 and carrying bearings 14 whose outer race ring carries the cylindrical hub 15 of the driving member 11. The latter comprises a generally flat disk with a V-belt groove 35 formed around its outer periphery. The hub 15 forms a friction drum of the same size as a drum 16 formed by the cylindrical intermediate portion of a disk 17 of Z-shaped cross-section having a hub 18 fixed to the outer end of the driven member 12. The two drums are arranged end to end and telescope within a free floating split band 19 with which the drums cooperate to form a main friction clutch for transmitting torque between the driving and driven members 11 and 12.

Herein the band 19 is collapsed radially to engage the main clutch by winding up a helically wound coil 20 of resilient magnetic wire telescoped closely around the band and having one end 21 hooked through a hole in the outer margin of the disk 17 and thereby anchored to the latter. The turn 22 at the opposite end of the coil is free and constitutes the armature of a pilot friction clutch 23 controlled by the winding 10 which is enclosed by a toroidal flux circuit 24 including a magnet core 25 fixed by a bracket 26 to a stationary support 27. The ends 25$^a$ and 25$^b$ of the core are disposed opposite inner and outer pole pieces respectively formed by inner and outer portions 29 and 28 of the driving member 11 separated and rigidly joined as by brazing their adjacent edge surfaces to a nonmagnetic connector or filling 30. The latter is preferably V-shaped in cross-section with its apex disposed when the clutch is deenergized about midway between the inner and outer edges of the armature 22 so that the inner and outer margins of the latter are disposed opposite faces 31 and 32 formed by the parts of the driving member and lying in a common axial plane close to the armature.

When the winding 10 is energized, the armature is attracted to and against the pole faces thus exerting a friction torque which winds up the actuator coil 20 and contracts the latter around the band to collapse the latter around the drums 15 and 16 and engage the main clutch. The coil unwinds and releases the clutch when the winding is again deenergized.

In accordance with the present invention, a high degree of over-all axial compactness is achieved by adapting the nonmagnetic connector or filling 30 to transmit all of the torque developed by the main clutch. For this purpose, the filling material, which preferably is nonmagnetic metal, is brazed securely to the outer edge of the inner pole piece 29 which comprises a narrow radial flange formed on the end of the drum 15 and projecting outwardly and partially across the face of the armature 22. The filling is similarly secured to the inner edge of the outer pole piece 28 and therefore to the drive pulley.

It will be apparent that the pulley 35 or other coupling device may, with arrangement above described, be located in or closely adjacent the plane of the main and pilot clutches which therefore may be arranged compactly in a space of minimum axial length. In the present instance, the V-belt groove of the pulley shown is disposed with its apex between opposite ends of the actuator coil 19. At the same time and by locating the nonmagnetic filling 30 in the torque transmission path, the construction of the parts is simplified thus contributing to the low cost of the over-all construction.

I claim as my invention:
1. A friction coupling having, in combination, two members disposed end to end and mounted for relative turning about a common axis, annular friction surfaces on the peripheries of the respective members, means coacting with said surfaces to form a main friction clutch adapted when activated to couple said members frictionally and including a helical coil of magnetic material telescoped with at least one of said surfaces, means anchoring one end turn of said coil to one of said members, the turn at the opposite end of said coil being free and constituting a magnet armature, a magnetic pilot friction clutch operable when activated to derive a torque from the relative turning of said members and apply such torque to said armature, said pilot clutch providing a toroidal flux path threading into and out of said armature and including a radial flange on the other of said members providing an axial face disposed opposite and overlapping the inner portion of the end face of said armature, a magnetic ring encircling said flange and providing an outer face overlapping the outer portion of said armature face, and a nonmagnetic means rigidly joining the adjacent edges of said ring and said flange, and torque transmitting means on said ring adapted to be coupled to a rotary part for effecting the transmission of rotary power radially between said ring, said nonmagnetic means, said flange and said main clutch.

2. A friction coupling as defined in claim 1 in which said torque transmitting means comprises a pulley having a V-belt groove disposed in a transaxial plane through said coil and main clutch.

References Cited by the Examiner

UNITED STATES PATENTS

| | | | |
|---|---|---|---|
| 1,208,842 | 12/1916 | Schnuck | 192—81 X |
| 2,401,003 | 5/1946 | Lear | 192—18.2 |
| 2,798,581 | 7/1957 | Supitilov. | |
| 2,976,976 | 3/1961 | Parker | 192—81 X |

DON A. WAITE, *Primary Examiner.*

ROBERT C. RIORDON, *Examiner.*